United States Patent [11] 3,626,258

| [72] | Inventor | David M. Makow |
| | | 14 Davidson Crescent, Ottawa 9, Ontario, Canada |
| [21] | Appl. No. | 84,737 |
| [22] | Filed | Oct. 28, 1970 |
| [45] | Patented | Dec. 7, 1971 |

[54] STANDARD CAPACITOR
9 Claims, 11 Drawing Figs.
[52] U.S. Cl. ..................................................... 317/242
[51] Int. Cl. ..................................................... H01g 1/02
[50] Field of Search ............................................ 317/242; 1/260

[56] References Cited
UNITED STATES PATENTS
793,647   4/1905   Fessenden .................... 317/242 X

*Primary Examiner*—E. A. Goldberg

ABSTRACT: Structures forming capacitors are described which consist of four suitably positioned electrodes closing on themselves so that end effects are eliminated. The mean of the two values of capacitance, represented by two pairs of diagonally opposite electrodes, is influenced to a very small degree only by the cross-sectional geometry of the electrodes. These properties permit construction of very accurate and stable capacitors. An example of one embodiment utilizes four rings as electrodes; the rings being enclosed by an external shield.

PATENTED DEC 7 1971　　　　　　　　　　3,626,258

Inventor
David M. Makins

PATENTED DEC 7 1971 3,626,258

Inventor
David M. Mallon

STANDARD CAPACITOR

This invention relates to capacitors and particularly to standard air or vacuum capacitors suitable for use as reference standards and absolute standards of electrical capacitance.

In general the value of capacitance is related to all three dimensions of the mechanical structure of a capacitor. For example in the plate capacitor the value is directly proportional to the two dimensions of the plate and inversely proportional to their spacing; in the coaxial capacitor the value is a function of the length of the two coaxial cylinders and their radii.

In an absolute standard of capacitance the value is determined from very accurate measurements of the dimensions. A mathematical formula which relates the dimensions to the value of capacitance must be calculated in order that such a structure can represent an accurate electrical standard. It is assumed that from the time of measurement of the dimensions, the latter will undergo only negligible changes and when the capacitor is put in use, that is, that it will remain very stable in all its dimensions.

In a reference standard of capacitance the value is determined from measurements against an absolute standard using bridge methods well known in the art. The only requirement is then that this value does not change subsequently in a unpredictable way. High stability is therefore the most important requirement of a reference standard.

A desirable design of such a capacitor seeks a configuration in which not all dimensions influence the capacitance to the first order. An example is the four cylinder capacitor by A. M. Thompson and D. G. Lampard first described in Nature Vol. 177, p. 888, May 12, 1956, which is used at present as the absolute international standard of capacitance. In this capacitor the mean of two cross capacitance values between diagonally opposite cylinders is a second order function of the cross-sectional symmetry and thus in practice it is only dependent on the length of these cylinders. The limitation of this structure is that the ends of the cylinders have to be terminated. Then the mechanical length which is measured by optical interferometry is not the same as the electrical length because of end effects. To overcome this difficulty this capacitor is used as an incremental capacitor defined as the difference of capacitance values between two positions of an internally interposed shield. Very high accuracies can then be obtained, but the great potential value of this capacitor is somewhat degraded by the requirement that the internal shield has to move in perfect parallelism with respect to the cylinders, which is very difficult to realize.

It is the object of the invention to provide a capacitor which retains most of the advantages of the four cylinder structure yet eliminates or minimizes its limitations.

It is another object of this invention to provide a capacitor of very high stability.

It is still another object of the invention to provide a capacitor suitable as a reference or absolute standard of capacitance.

These and other objects of the invention are achieved by providing a capacitor comprising four rings suitably positioned with respect to each other and surrounded by an external shield. It is evident that the problems connected with the end effects of the four cylinder structure do not exist here since the rings have no ends and the electrode surfaces close on themselves. It has been theoretically in the publication by D. Makow "A New Computable Standard of Capacitance" Metrologia Vol. 5, No. 4, Oct. 1969, pp. 126-128 and it has later been proven experimentally in the laboratory that the man capacitance $C_0$ of the two cross capacitance values $C_1$ and $C_2$ between diagonally opposite rings is a second order function of deviations $\Delta C$ from the symmetrical case $C_1=C_2=C$, as shown below:

$$\frac{C_0}{C} = 1 + 0.0867\left(\frac{\Delta C}{C}\right)^2 - 0.0016\left(\frac{\Delta C}{C}\right)^4 + \ldots$$

where $$C_0 = \frac{C_1+C_2}{2} \text{ and } \Delta C = C_1 - C_2$$

The capacitance per unit of circumference for ring spacing $s$ equal to one tenth of small ring diameter $d$, is given by $$\frac{C}{\pi D} = \frac{10^{10} \ln 2}{4\pi^2 c^2}\left[1 - 0.054975\left(\frac{d}{D}\right)^2 - 0.0039925\left(\frac{d}{D}\right)^4 - \ldots\right] pF/m$$

where $c$ = velocity of light = $2.997925 \cdot 10^8$ m/s and $D$ = large diameter of the rings.

Thus it is the large diameter which determines the capacitance $C$, and the small diameter and the spacing have much less influence.

These properties have great significance since they permit relatively moderate precision of fabrication to achieve a highly accurate value. In addition, subsequent deformation of the structure after assembly, such as due to relaxation of internal stresses in the material or due to aging, vibration or shock will much less effect on the value of capacitance, assuring high stability.

The electrical field is almost totally confined to the internal space between the rings. When the ratio $s/d$ of the ring spacing $s$ to the cross-sectional diameter $d$ is less than one tenth, the external field is then less than one part in one million and it decreases very rapidly for smaller spacing. This property eliminates any precision requirements of construction of the external shield and the external surfaces of the ring. A practical example of such capacitors where the external surfaces have been made to be flat while the internal surfaces are round, is shown later in the text.

In drawings which illustrate embodiments of the invention,

Figure 1:
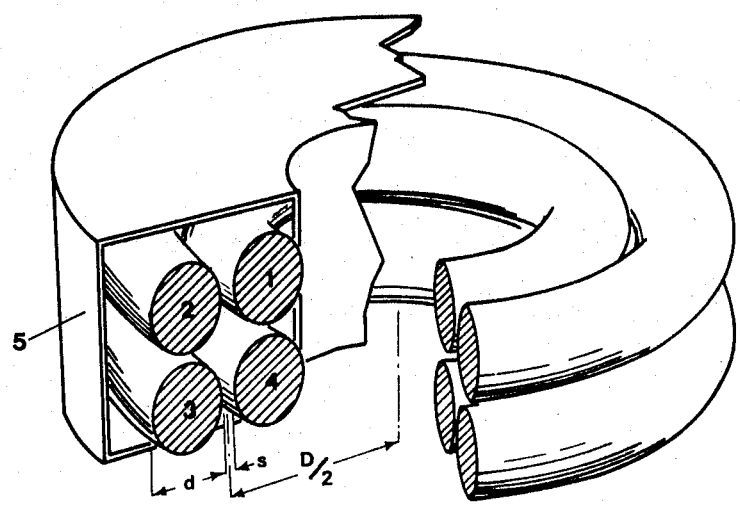
FIG. 1 shows a perspective view of the capacitor consisting of four rings, and surrounded by an external shield.
Figure 6:
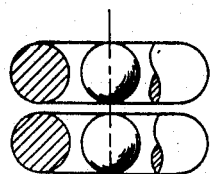

FIG. 6 extends the principle of the capacitor shown in FIG. 1 by substituting the inner rings by spheres.

Figure 7:
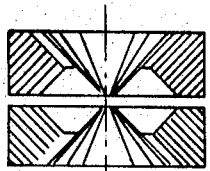

FIG. 7 shows the capacitor similar to the one shown in FIG. 6, where the curved cross sections of the rings and spheres where substituted by straight lines.

Figure 4:
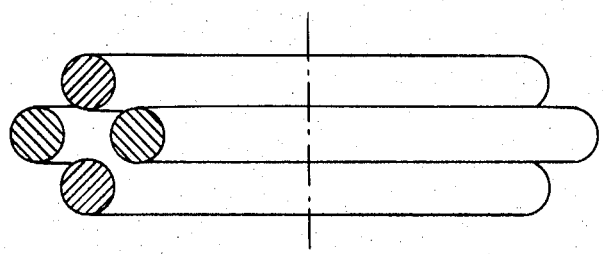
FIG. 4 shows a cross section of the capacitor in which the cross section of the four rings was turned by 45° with respect to its axis of rotation.
Figure 8:
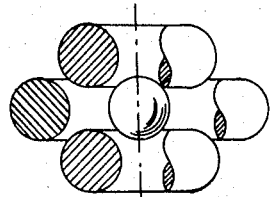

FIG. 8 extends the principle of the capacitor shown in FIG. 4 by substituting the inner rings by spheres.

Figure 9:
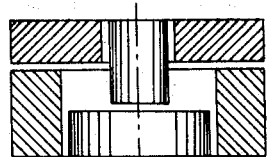

FIG. 9 shows the capacitor shown in FIG. 8 where the curved cross sections of the rings and spheres were substituted by straight lines.

Figure 10:
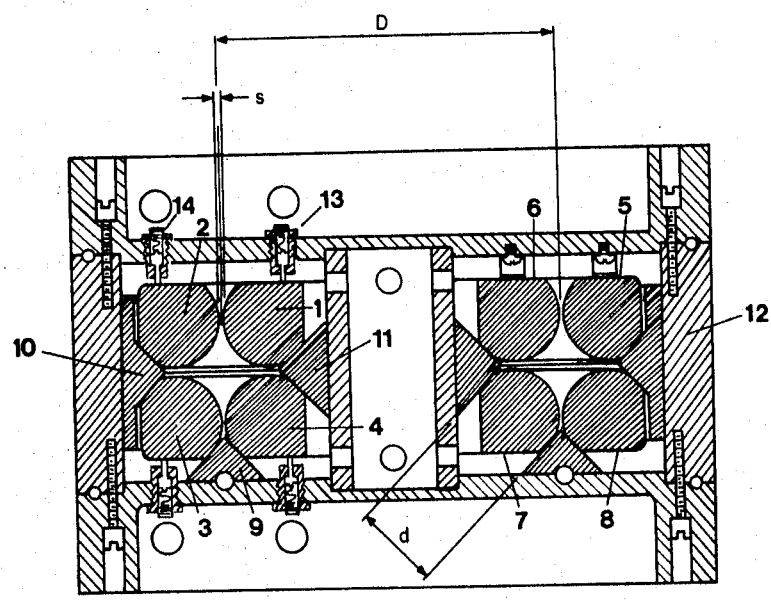

FIG. 10 shows a practical embodiment of the capacitor of FIG. 1.

Figure 11:
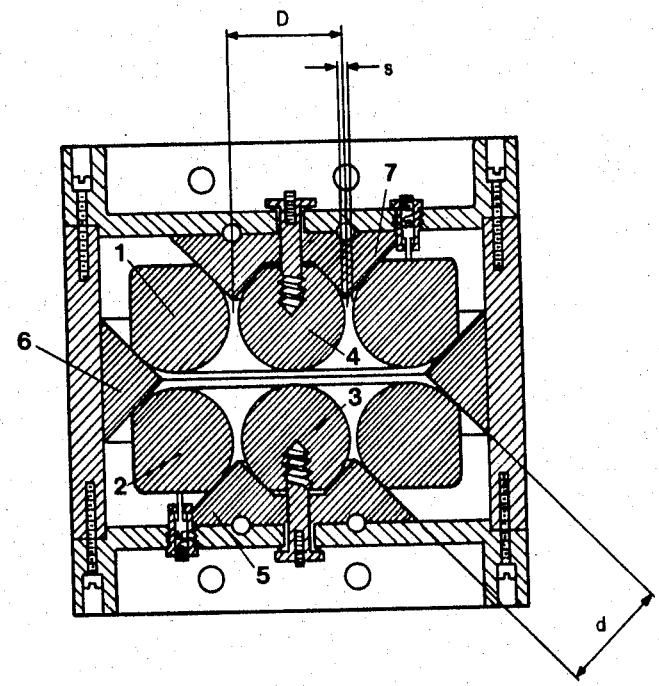

FIG. 11 shows a practical embodiment of the capacitor shown in FIG. 6.

Referring to FIG. 1, four rings 1, 2, 3 and 4, which can be solid or hollow, are suitably positioned and supported with respect to each other and are surrounded by an external shield 5. The capacitance is measured between ring 1 and 3 while ring 2 and 4 and the shield 5 are at ground potential. In the second measurement the potentials are interchanged between rings 1, 3 and 2, 4. The mean value of these two measurements is then a second order function of deviations from cross-sectional symmetry.

Figure 2:
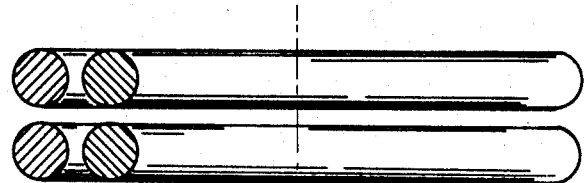
FIG. 2 shows a cross section of the capacitor shown in FIG. 1.

FIG. 2 shows the cross section of the capacitor shown in FIG. 1.

Figure 3:
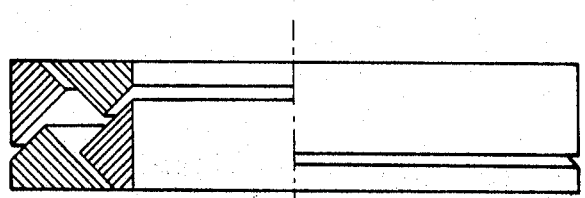
FIG. 3 shows a cross section of the capacitor similar to the one shown in FIG. 1 in which the curved cross sections of the electrodes were substituted by straight lines.

FIG. 3 shows a variation of the capacitor in which the curved line of the cross section of the rings is replaced by a straight line. Such a structure, though having similar properties, has a poorly defined region in the neighborhood of the gaps due to the fact that the two electrodes meet at right angles and do not converge gradually to a zero angle, as in the former case. The advantage is the greater ease of fabrication.

Figure 5:
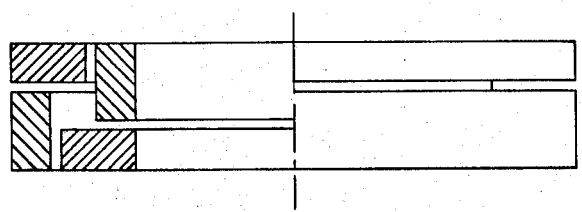
FIG. 5 shows a capacitor similar to the one shown in FIG. 4 where the curved cross sections of the rings were substituted by straight lines.

FIGS. 4 and 5 show structures having similar but not identical properties. Here the cross section of the four rings is rotated by 45°. Mechanically this configuration offers some advantages. Electrically the second order property can be only obtained by defining a new value of capacitance which is a function of the two cross capacitance values each multiplied by a weighing factor, the latter being a function of the cross capacitances themselves.

FIG. 6 shows a variation of the four-ring capacitor where the diameter of the inner rings has been decreased to the point where these rings become spheres. This capacitor still retains the second order property discussed previously and has the promise of still higher stability because it represents a more solid configuration.

FIGS. 7, 8 and 9 show the same logical extension of FIGS. 3, 4 and 5. These configurations should be regarded as illustrations of the principle and not as a guide to the design. A person skilled in the art would suggest other suitable electrode and gap shapes as well as methods of mounting and assembling the individual parts of these capacitors.

FIG. 10 shows a practical embodiment of the four-ring capacitor shown in FIG. 1 with $d=2.5$ cm. and $D=10$ cm. These dimensions will give a value of capacitance of about 0.615 pf. The four quartz rings 1, 2, 3 and 4 have metallized surfaces 5, 6, 7 and 8, and are aligned by means of a suitable quartz support rings 9, 10 and 11 also having circular symmetry. The assembly of the rings in the box 12 will proceed from bottom to top. Then spring pressure will be applied on three points of the top rings and the cover will be closed. Electrical contact is made by means of suitable connectors 13 and 14. This capacitor will have a very small temperature coefficient and can be sealed and evacuated.

FIG. 11 shows a capacitor which consists of two rings 1, 2 and two spheres 3, 4. The dimensions will be $D=3.55$ cm. and $d=3.25$ cm., and the value about 0.2 pf. Positioning will also be achieved with support rings 5, 6 and 7 as in the preceding case with the exception that the upper sphere will be connected to a support ring. Other ways of positioning the rings will be evident to a person skilled in the art.

The various embodiments of the invention as shown in the FIGS. 1 to 11 utilize separate bodies such as rings and spheres for the four electrodes of the capacitor. Since it is the surface of the body in which the electrical charge collects, it is possible to provide fewer than four bodies and to deposit more than one electrode on each body. For example in FIG. 10 the outer two rings could be machined out of one piece of quartz and two metallic electrode surfaces could be deposited on each piece with suitable breaks in the region of the gaps. The same could be done with the inner rings.

What is claimed is:

1. A capacitor comprising at least one supporting structure having together four electrically conductive surfaces, which close on themselves thus eliminating or minimizing the end effects; the said surfaces being separated from each other by insulating spacers; the said surfaces having electrical connections for external apparatus, all the said structures being enclosed by an external shield.

2. A capacitor as in (1) in which the supporting structures are rotational bodies such as rings, discs, cylinders, cones, or spheres having together four electrically conductive surfaces, which close on themselves to eliminate or minimize end effects; the said surfaces having electrical connections for external apparatus, all the said surfaces being enclosed by an external shield.

3. A capacitor as in (2) in which the supporting structures are four rings, each having one electrically conductive surface which closes on itself, all the rings being enclosed by an external shield; the said surface having electrical connections for external apparatus, all the said structures being enclosed by an external shield.

4. A capacitor as in (2) in which the supporting structures are three rings and one rotational body such as a sphere or cylinder, each structure having one electrically conductive surface which closes on itself; the said surfaces having electrical connections for external apparatus, all the said surfaces being enclosed by an external shield.

5. A capacitor as in (2) in which the supporting structures are two rings and two rotational bodies such as spheres, cylinders, discs or cones, each structure having one electrically conductive surface which closes on itself, the said surfaces having electrical connections for external apparatus, all the said structures being enclosed by an external shield.

6. A capacitor as in (2) in which the supporting structure is one ring and one rotational body, each having two electrically conductive surfaces which close on themselves; the said surfaces having electrical connections for external apparatus, all the said structures being enclosed by an external shield.

7. A capacitor as in (2) in which the supporting structure is one ring and one rotational body, the ring having one electrically conductive surface which closes on itself and the rotational body having three electrically conductive surfaces which close on themselves; the said surfaces having electrical connections for external apparatus, all the said structures being enclosed by an external shield.

8. A capacitor as in (2) in which the supporting structure is one ring and one rotational body, the ring having three electrically conductive surfaces which close on themselves and the rotational body one electrically conductive surface which closes on itself; the said surfaces having electrical connections for external apparatus, all the said structures being enclosed by an external shield.

9. A capacitor as in (2) in which the supporting structure is one rotational body having four electrically conductive surfaces which close on themselves; the said surfaces having electrical connections for external apparatus, all the said structures being enclosed by an external shield.

* * * * *